(12) United States Patent
Fujiyoshi

(10) Patent No.: US 8,339,350 B2
(45) Date of Patent: Dec. 25, 2012

(54) IMAGE DISPLAY METHOD AND APPARATUS

(75) Inventor: Tatsumi Fujiyoshi, Miyagi-ken (JP)

(73) Assignee: Edios Advanced Display, LLC, Washington, DC (US)

( * ) Notice: Subject to any disclaimer, the term of this patent is extended or adjusted under 35 U.S.C. 154(b) by 841 days.

(21) Appl. No.: 12/368,491

(22) Filed: Feb. 10, 2009

(65) Prior Publication Data
US 2009/0195493 A1 Aug. 6, 2009

Related U.S. Application Data

(63) Continuation of application No. 08/960,481, filed on Oct. 29, 1997, now abandoned, which is a continuation of application No. 08/686,180, filed on Jul. 23, 1996, now abandoned.

(30) Foreign Application Priority Data

Aug. 4, 1995 (JP) ....................................... 7-199959

(51) Int. Cl.
G09G 3/36 (2006.01)
(52) U.S. Cl. .......................................... 345/98; 345/87
(58) Field of Classification Search ..................... 345/87, 345/89, 98, 100, 204, 690–693
See application file for complete search history.

(56) References Cited

U.S. PATENT DOCUMENTS

| | | | | |
|---|---|---|---|---|
| 5,254,982 A | * | 10/1993 | Feigenblatt et al. | 345/690 |
| 5,289,294 A | * | 2/1994 | Fujisawa | 358/461 |
| 5,373,455 A | * | 12/1994 | Edgar | 382/252 |
| 5,444,461 A | * | 8/1995 | Oz et al. | 345/605 |
| 5,450,098 A | * | 9/1995 | Oz | 345/605 |
| 5,596,349 A | * | 1/1997 | Kobayashi et al. | 345/690 |

* cited by examiner

Primary Examiner — Ricardo L Osorio
(74) Attorney, Agent, or Firm — McKenna Long & Aldridge, LLP

(57) ABSTRACT

An image display method and apparatus for generating display data from predetermined high-order bits of original image data, the display data reflecting an error of low-order bits in the original image data. The display data is used to drive each of pixels arranged in line and column directions. The high-order three bits of six-bit original image data are regarded as intra-frame process data. A process value is determined based on the low-order three bits of the original image data, on a frame number, on a line number and on a column number. That process value is added to the least significant bit of the intra-frame process value made of the high-order three bits, whereby three-bit display data is generated. The addition of the process value evenly distributes the gray level error of the low-order three bits within each frame and between frames for simulated high quality gray level display.

9 Claims, 12 Drawing Sheets

FIG. 6A  [J, K, L] ORIGINAL IMAGE DATA  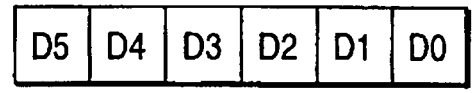
FIG. 6B  [J, K, L-1] INTRA-FRAME ERROR DATA  (ERROR DATA LATCH CIRCUIT) 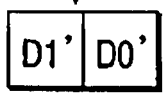

FIG. 6D  [J, K, L] INTRA-FRAME PROCESS DATA  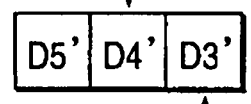 (SECOND LATCH CIRCUIT)
FIG. 6E  [J, K, L] INTRA-FRAME ERROR DATA  
FIG. 6F  INTER-FRAME PROCESS DATA  
FIG. 6G  [J, K, L] DISPLAY DATA  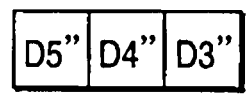

FIG. 7A  [J, K, L] ORIGINAL IMAGE DATA 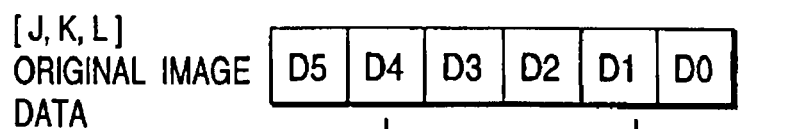
FIG. 7B  [J, K, L] INTRA-FRAME PROCESS DATA 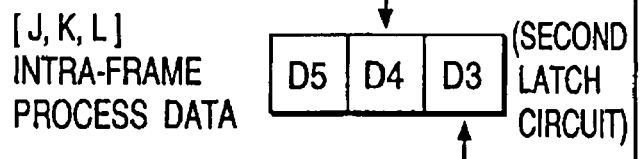

FIG. 7D  INTER-FRAME PROCESS DATA 
FIG. 7E  [J, K, L] DISPLAY DATA 

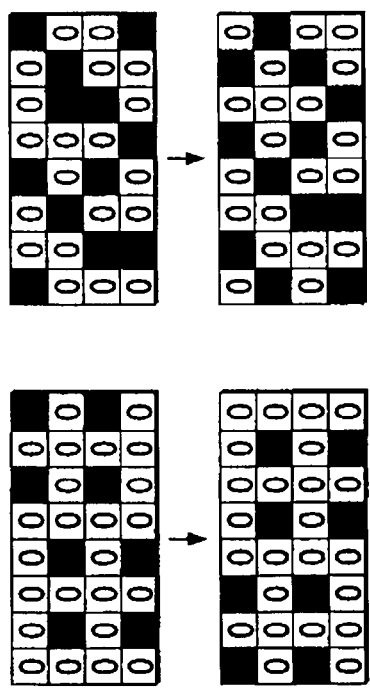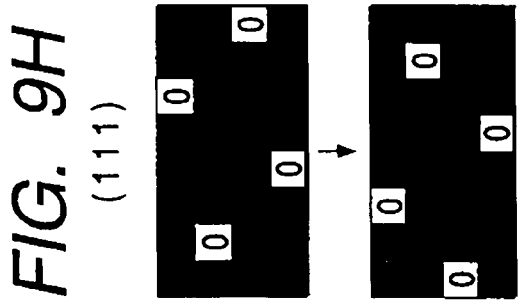

FIG. 10
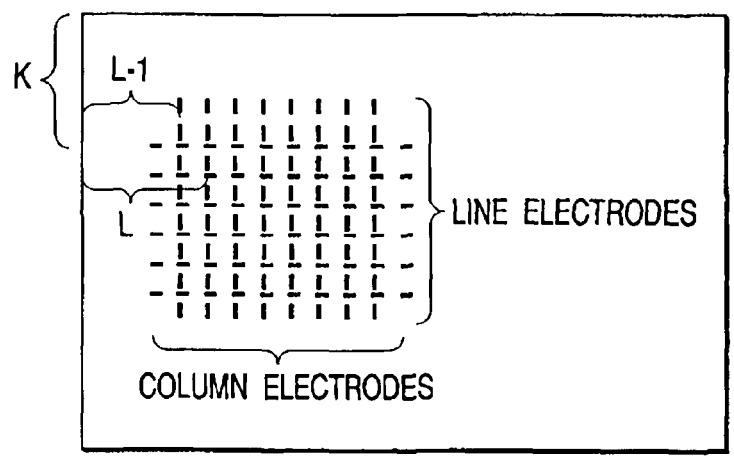
FIG. 11A PRIOR ART  [L] ORIGINAL IMAGE DATA
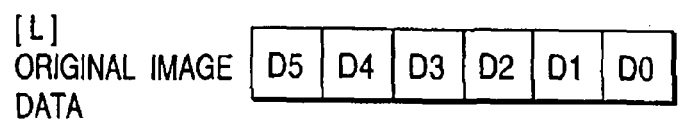
FIG. 11B PRIOR ART  [L-1] ERROR DATA
FIG. 11C PRIOR ART  DISPLAY DATA
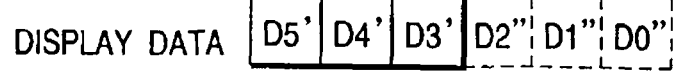

FIG. 12A PRIOR ART  [L] ORIGINAL IMAGE DATA 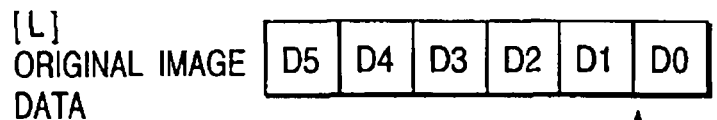
FIG. 12B PRIOR ART  [L-1] ERROR DATA 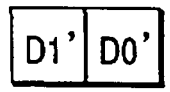

FIG. 12D PRIOR ART  INTER-FRAME ERROR DATA OF PRECEDING FRAME 
FIG. 12E PRIOR ART  DISPLAY DATA 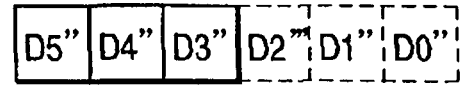
FIG. 13A PRIOR ART  LOW-ORDER 3 BITS (001)
FIG. 13B PRIOR ART

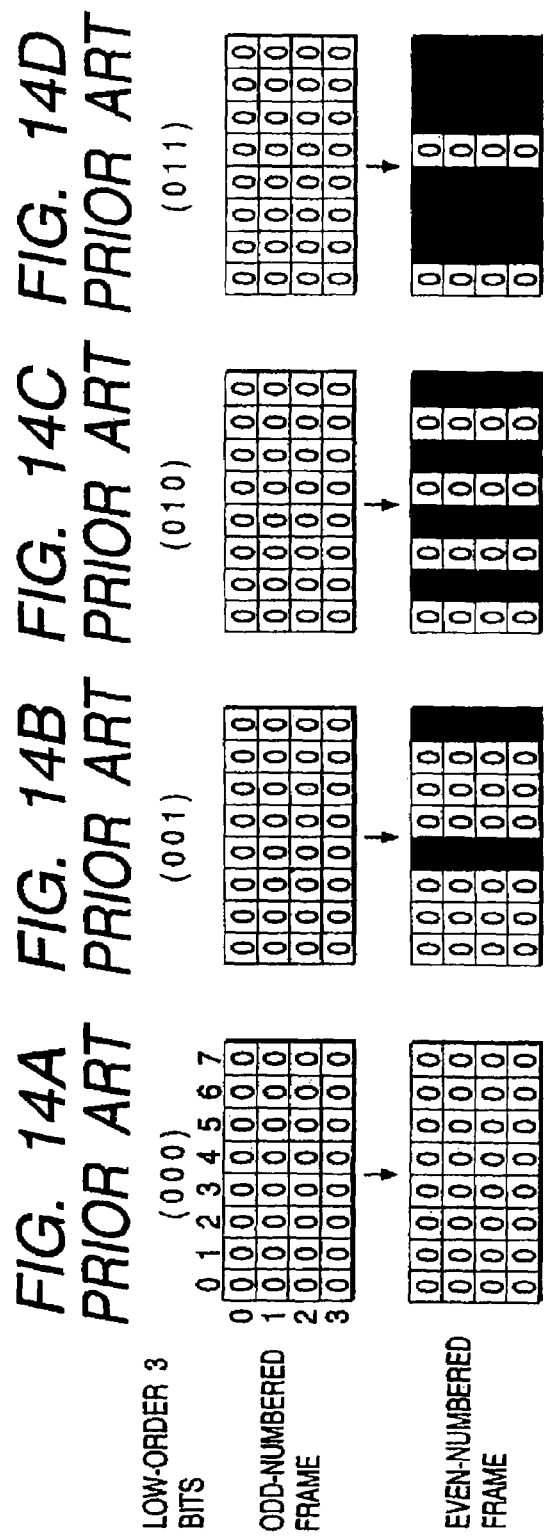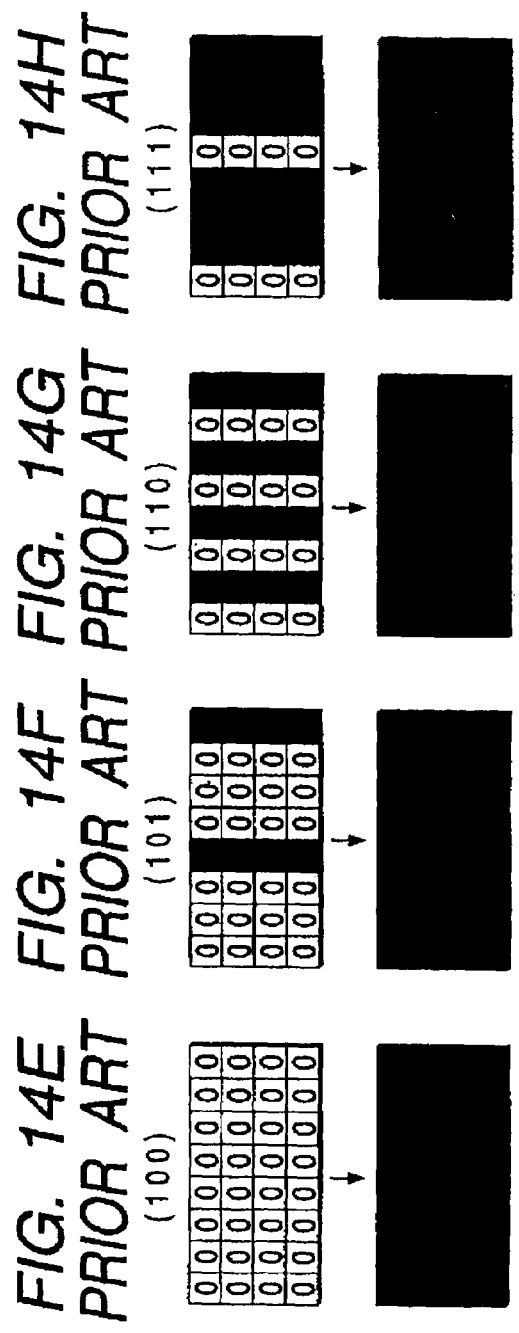

IMAGE DISPLAY METHOD AND APPARATUS

BACKGROUND OF THE INVENTION

1. Field of the Invention

The present invention relates to an image display apparatus having pixels continuously arranged in the line and column directions. More particularly, the invention relates to an image display method and an image display apparatus for generating display data out of original image data for gradation display, wherein the bits constituting the display data are fewer than those making up the original image data.

2. Description of the Related Art

The liquid crystal display (LCD) apparatus for use with computers is a typical image display apparatus on which images are displayed in gradations on the basis of the original image data made up of digital signals. This type of image display apparatus works primarily by generating display data from the original image data, with the display data comprising fewer bits (X bits, e.g., 3 bits) than the original image data having Y bits (e.g., 6 bits). The display data thus generated is used as the basis for driving each of the pixels of a display panel for gradation display. Illustratively, whereas six-bit original image data permits image display at 64 gray levels, each pixel is capable of a display only at eight gray levels if the pixel is driven on the basis of three-bit display data. The display image gray level count is enhanced by a known image signal processing method whereby the high-order X bits of the original image data are used as display data and the low-order Y–X bits (e.g., 3 bits) as error data. The gradations in which to display images by the low-order Y–X bits are diffused among the display data for each of the pixels so that the gradations corresponding to the low-order Y–X bits will be simulated by a plurality of pixel groups.

FIGS. 11A through 11C and FIGS. 12A through 12E show how such a conventional signal processing method diffuses the error between original image data and display data among pixels for simulated gradation display. FIG. 10 indicates a screen of one frame (i.e., 1 screen). Dots in the screen represent a pixel each. In the description that follows, a crosswise arrangement of pixels on the screen will be called a line, and a longitudinal arrangement of pixels will be called a column. In FIG. 10, the pixels on a line K, columns L−1 and L, are indicated as a point each. On the ordinary LCD apparatus, lines are selected sequentially while the columns are fed simultaneously with driving voltages representing display data. The pixels then give display in gradations depending on the supplied driving voltages.

FIGS. 11A through 11C depict a conventional example in which image signals are processed through error diffusion. FIG. 11A shows original image data to be fed to the pixel on the line K, column L, the pixel being shown as a point in FIG. 10. The original image data of this example is made up of six bits, with D0 representing the least significant bit and D5 denoting the most significant bit in FIG. 11A. The conventional signal processing method cited here utilizes as error data the low-order three bits (D2', D1', D0') derived from the processing of the six-bit original image data given to the pixel on the column L−1 preceding the column L (see FIG. 11B). The three-bit error data is added to the original image data of six bits in FIG. 11A. Of the six-bit data resulting from the addition shown in FIG. 11C, the high-order three bits (D5', D4', D3') are used as display data. The display data is used as the basis for supplying driving voltages to the pixel on the line K, column L, so that the pixel is driven to predetermined gray levels. The low-order three bits (D2", D1", D0") are used as the error data for the pixel on the next column L+1.

FIG. 13A shows eight pixels arranged in a line. Suppose that the eight pixels in FIG. 13A are all fed with the same original image data and that the low-order three bits (D2, D1, D0) are "001." In that case, the error diffusion processing method of FIGS. 11A through 11C works as follows. The three-bit error data is added consecutively to the low-order three bits of the original image data. At the pixel in the position $2^3$ (i.e., eighth pixel), the most significant bit (D2") of the error data generates a carry, adding "1" to the least significant bit (D3') of the display data. As a result, the eighth pixel in FIG. 13A gives a display one gray level higher than that of the remaining seven pixels. This allows a set of eight pixels to simulate the gray level that is to be represented by the low-order three bits of the original image data.

One disadvantage of the error diffusion processing in FIGS. 11A through 11C is a degradation of image quality that can happen when an image of the same gray level is continuously displayed as a still picture in a fixed area of the screen, i.e., when the original image data corresponding to the pixels constituting a fixed area remains the same for an extended period of time. For example, suppose that as shown in FIG. 13B, the same original image data with its low-order three bits of "001" continues to be fed to a pixel group comprising 8×4 contiguous pixels occupying a certain area. In such a case, the same column continuously has pixels in which "1" is added to the least significant bit of the three-bit display data (indicated as black fill-in in FIGS. 13A and 13B). In the line direction, the black fill-in appears at intervals of eight pixels. The result is a set of fine longitudinal stripes appearing in the still picture of a given gray level.

One solution to the deficiency above is a technique of inter-frame compensation for the error from expressing gray levels with low-order bits of original image data. One such technique is an inter-frame error diffusion processing method disclosed illustratively in Japanese Patent Laid-Open No. Hei 6-118920 (1994).

FIGS. 12A through 12E show how the disclosed method above works for inter-frame diffusion of gradation display error. FIG. 12A indicates original image data corresponding to the pixel on the line K, column L in FIG. 10. As in the example of FIGS. 11A through 11C, the original image data is made up of six bits. This processing method utilizes as inter-frame error data the low-order two bits (D1', D0') following the processing of the original image data corresponding to the pixel on the line K, column L−1 preceding the column L (FIG. 12B). The two-bit inter-frame error data is added to the low-order two bits of the original image data shown in FIG. 12A. FIG. 12C illustrates six-bit data derived from the addition. To the data in the fourth most significant bit (D2') in FIG. 12C is added the inter-frame error data (D2") corresponding to the pixel in the same position as that of the preceding frame. As shown in FIG. 12E, the high-order three bits resulting from the addition are used as display data for driving the pixel. The low-order two bits (D1", D0") are used as the intra-frame error data for the pixel on the next column L+1, while the fourth most significant bit (D2") is used as the inter-frame error data for the pixel on the line K, column L of the next frame.

In short, the above processing method regards the low-order two bits of the six-bit original image data as inter-frame error data, uses the fourth most significant bit as intra-frame error data, and employs the high-order three bits as display data.

With the conventional processing method for inter-frame error diffusion of FIGS. 12A to 12E, suppose that original image data of the same gray level is applied to all pixels constituting a certain screen area for a predetermined period of time. FIGS. 14A through 14H depict groups of 8×4 pixels giving gradation display under the above condition. FIG. 14A shows a case where the pixels in the pixel group occupying the fixed screen area are fed with the same original image data having the low-order three bits of "000"; FIG. 14B is a case where the pixels are supplied with the same original image data having the low-order three bits of "001"; FIGS. 14C through 14H each indicate a case where the pixels are likewise supplied with the same original image data with its low-order three bits fed consecutively with "1." It follows that in FIG. 14H, the low-order three bits of the same original image data given to the pixels involved are "111." In each of FIGS. 14A through 14H, the upper view is a screen corresponding to an odd-numbered frame, and the lower view is a screen corresponding to an even-numbered frame continued temporally to the odd-numbered frame.

In the screens resulting from the signal processing of FIGS. 12A through 12H, each pixel in which "1" is added to the least significant bit of the three-bit display data is painted black, and the pixels not fed with "1" are each indicated as "0."

The inter-frame error diffusion method above is now compared with the intra-frame error diffusion processing method of FIGS. 11A through 11C. According to the processing method of FIGS. 11A through 11C, if the original image data corresponding to the pixels occupying a certain screen area has the low-order three bits of "001," the added error data is reflected at intervals of eight pixels as shown in FIG. 13B. According to the processing method of FIGS. 12A through 12E, on the other hand, if the original image data corresponding to the pixels occupying the fixed screen area also has the low-order three bits of "001," the added error data is reflected at intervals of four pixels as shown in the lower view of FIG. 14B. The latter method provides better gradation quality for the still picture than the case of FIGS. 13A and 13B because the inter-frame error diffusion shortens the distance between the pixels in which the added error is reflected.

However, in FIGS. 14B, 14C and 14D, the pixels to which "1" is added (i.e., black-painted pixels) are identically arranged between adjacent lines and these pixels continue in the column direction within the frame. As a result, longitudinal strips are unavoidable in the still picture. Furthermore, as shown in FIGS. 14D, 14B and 14F, there occurs a drastic difference in the number of "1"-fed pixels between an odd- and an even-numbered frame. This leads to a flicker phenomenon contingent on the gray level of the still picture. In FIG. 14E, for example, the flickers are particularly pronounced depending on the gray level because there are no black-filled pixels in the odd-numbered frame while all pixels are black in the even-numbered frame.

The processing method of FIGS. 12A through 12E requires retaining for a one-frame interval the inter-frame error data about the pixels in the same positions as those of the preceding frame. This entails extremely complicated control procedures regarding data write and read operations.

SUMMARY OF THE INVENTION

It is therefore an object of the present invention to overcome the above-described drawbacks and disadvantages and to provide an image display method and an image display apparatus for furnishing different arrangements of pixels in which to reflect error data between adjacent lines in diffusing error data between frames, whereby the appearance of longitudinal stripes on the screen is minimized even if the original image data corresponding to the pixels constituting a certain screen area remains the same.

It is another object of the present invention to provide an image display method and an image display apparatus for evenly distributing the number of pixels in which to reflect error data between frames so that images are displayed in gradations through inter-frame error diffusion, whereby the appearance of flickers on the screen is minimized even if the original image data corresponding to the pixels constituting a certain screen area remains the same.

It is a further object of the present invention to provide an image display method and an image display apparatus for using the original image data corresponding to the pixels on the same line as the basis for generating process values by which to diffuse error data inside each frame as well as process values by which to diffuse error data between frames, whereby the processing involved is simplified.

In carrying out the invention and according to one aspect thereof, there is provided an image display method comprising the steps of: generating display data made of X bits from original image data composed of Y bits, the X bits being fewer than the Y bits; using the X-bit display data to drive each of pixels arranged in line and column directions; and generating a binary-signal process value to be added to intra-frame process data based on the high-order X bits of the original image data. With this method, if the same original image data is made to correspond with a group of pixels on $2^{(Y-X)}$ columns continued on each of a predetermined number of lines, the process value is arranged so that each of adjacent lines in the pixel group will have a different combination of pixels in which the process value of "1" is added to the intra-frame process data.

FIGS. 8A through 8H and 9A through 9H depict how the inventive image display method outlined above works in a typical setup where original image data is made up of six bits (=Y) and display data is composed of the high-order three bits (=X) of the original image data. Each of the figures indicates a group of $2^3$ (i.e., 8) pixels continued on each of four continuous lines. The same original image data is made to correspond with the 8×4 pixel group. FIGS. 8A and 9A show a case in which the low-order three bits of the same original image data corresponding to the pixels are "000," FIGS. 8B and 9B depict a case where the low-order three bits are "001," FIGS. 8C and 9C indicate a case in which the low-order three bits are "010," and FIGS. 8H and 9H illustrate a case wherein the low-order three bits are "111." According to the invention, a process value F1 (FIGS. 6A through 6G) or a process value F2 (FIGS. 7A through 7E) is added to the least significant bit of the high-order three bits constituting the display data. Where the low-order three bits are furnished as shown in FIGS. 8A through 8H and 9A through 9H, the pixels in which the process value of "1" is added to the display data are painted black, and the pixels not fed with "1" are each indicated as "0."

With the above inventive method in use, when the same original image data is made to correspond with the pixels in the pixel group shown in FIGS. 8A through 8H and 9A through 9H, each of adjacent lines is arranged to have a different combination of pixels in which the process value of "1" is added. This means that the original image data corresponding to the pixels in the pixel group constituting an extensive area remains the same during the display of a temporally continuous still picture, whereby the appearance of longitudinal stripes is minimized.

Preferably, if the same image data is made to correspond with the pixels in the pixel group over two temporally continuous frames, each of the two frames is arranged to have a different combination of pixels in which the process value of "1" is added to the intra-frame process data.

That is, the pixel layout pattern may be made different between the odd- and even-numbered frames shown respectively in the upper and lower portions of FIGS. 8A through 8H and 9A through 9H, the pattern being that of the pixels in which the process value of "1" is added to the least significant bit of the display data (3 bits). This makes it possible to diffuse the error between the original image data and the display data both within each frame and between frames.

According to another aspect of the invention, there is provided an image display method comprising the steps of: generating display data made of X bits from original image data composed of Y bits, the X bits being fewer than the Y bits; using the X-bit display data to drive each of pixels arranged in line and column directions; and generating a binary-signal process value to be added to intra-frame process data based on the high-order X bits of the original image data. With this method, if the same original image data is made to correspond with a group of pixels on $2^{(Y-X)}$ columns continued on each of a predetermined number of lines constituting two temporally continuous frames, the process value is arranged so that each of the two frames will have the same number of pixels in which the process value of "1" is added to the intra-frame process data in the pixel group.

FIGS. 8A through 8H and 9A through 9H each show an odd- and an even-numbered frame in the upper and lower portions respectively, each of the two frames having the same original image data corresponding to the 8×4 pixels. In each of these figures, the number of black-painted pixels to which the process value of "1" is added is the same in the two frames. Thus where the original image data corresponding to each of the pixels including the 8×4 pixels (FIGS. 8A through 8H, 9A through 9H) making up a certain area remains the same for a certain period of time (i.e., over a plurality of frames), gray levels are expressed effectively by the low-order three bits of the original image data. Furthermore, unlike the conventional example shown in FIG. 14A through 14H, the above method eliminates between frames the inordinate difference in the number of pixels in which the process value of "1" is added. This minimizes the appearance of flickers.

According to a further aspect of the invention, there is provided an image display method comprising the steps of: generating display data made of X bits from original image data composed of Y bits, the X bits being fewer than the Y bits; using the X-bit display data to drive each of pixels arranged in line and column directions; and generating a binary-signal process value to be added to intra-frame process data based on the high-order X bits of the original image data. With this method, if the same original image data is made to correspond with a group of pixels on $2^{(Y-X)}$ columns continued on each of a predetermined number of lines constituting two temporally continuous frames, the process value is arranged so that each of the two frames will have the same number of pixels in which the process value of "1" is added to the intra-frame process data in the pixel group and that each of adjacent lines in the pixel group will have a different combination of pixels in which the process value of "1" is added to the intra-frame process data.

With the above method, as shown in FIGS. 8A through 8H and 9A through 9H, each of adjacent lines is arranged to have a different combination of pixels in which the process value of "1" is added to the display data for diffusing the error data within the same frame. For error diffusion between frames, each of the two temporally continuous frames is arranged to have the same number of pixels in which the process value of "1" is added. This method provides an effectively simulated gradation display of the temporally continuous still picture where the same original image data is supplied corresponding to all pixels constituting a certain screen area, including the pixel group shown in FIGS. 8A through 8H and 9A through 9H.

Preferably, if $m/2^{(Y-X)}$ represents the ratio of the number of pixels in which the process value of "1" is added, to the total number of pixels in the pixel group over the two temporally continuous frames, then m is a decimal number expressed by the low-order Y–X bits of the original image data.

When the above variation of the method is applied to the setups of FIGS. 8A through 8H and 9A through 9H, $2^{(Y-X)}=8$ because Y=6 and X=3. Illustratively, in FIGS. 8C and 9C, the number of black-painted pixels to which the value of "1" is added is 16 for two frames and the total number of pixels over two frames is 64. The ratio is thus 2/8, hence m=2. In FIGS. 8C and 9C, the decimal number expressed by the low-order three bits of "010" is 2, which coincides with the preceding value of m.

Outlined below are some image display apparatuses practiced to embody the invention.

According to an even further aspect of the invention, there is provided an image display apparatus for generating display data made of X bits from original image data composed of Y bits, the X bits being fewer than the Y bits, and for using the X-bit display data to drive each of pixels arranged in line and column directions. This image display apparatus comprises: control means for generating a process value from the most significant bit of the low-order Y–X bits in the Y-bit original image data, from data indicating a frame, and from data indicating the line to which the driven pixel belongs; and adding means for generating the display data by adding the process value to intra-frame process data based on the high-order X bits of the original image data.

FIGS. 6A through 6G show how data is processed illustratively by the inventive image display apparatus outlined above. As indicated in FIG. 6F, a process value F1 is generated from the most significant bit (D2') of the low-order three bits, from data J indicating a frame and from data K indicating a line in FIG. 6E. The process value F1 thus generated is added to the least significant bit of the intra-frame process data to generate the display data.

According to a still further aspect of the invention, there is provided an image display apparatus for generating display data made of X bits from original image data composed of Y bits, the X bits being fewer than the Y bits, and for using the X-bit display data to drive each of pixels arranged in line and column directions. This image display apparatus comprises: first adding means for adding to the original image data as inter-frame error data predetermined low-order bits of the data corresponding to the preceding pixel on the same line; control means for generating a process value from the most significant bit of the low-order Y–X bits in the data resulting from the addition, from data indicating a frame, and from data indicating the line to which the driven pixel belongs; and second adding means for generating the display data by adding the process value to intra-frame process data based on the high-order X bits of the original image data. In the case of FIG. 6B, the predetermined low-order bits are Y–(X+1) bits.

In the image display apparatus providing the data processing of FIGS. 6A through 6G, the first adding means adds to the original image data the intra-frame error data of the low-order two bits corresponding to the preceding pixel on the same line. The six-bit data resulting from the addition is shown in FIG. 6C. A process value F1 is generated from the most significant bit of the low-order three bits in the data of FIG. 6C resulting from the addition, from data J indicating a frame, and from data K indicating a line. The process value F1 thus generated is added to the least significant bit of the intra-frame process data to generate the display data shown in FIG. 6G. FIGS. 8A through 8H depict how the process value is added to each of the pixels in the display data.

According to a yet further aspect of the invention, there is provided an image display apparatus for generating display data made of X bits from original image data composed of Y bits, the X bits being fewer than the Y bits, and for using the X-bit display data to drive each of pixels arranged in line and column directions. This image display apparatus comprises: control means for generating a process value from the low-order Y–X bits in the Y-bit original image data, from data indicating a frame, from data indicating the line to which the driven pixel belongs, and from data indicating the column of the driven pixel; and adding means for generating the display data by adding the process value to intra-frame process data based on the high-order X bits of the Y-bit original image data.

In the above image display apparatus, a process value F2 is generated from each of the low-order three bits (D2, D1, D0) shown in FIG. 7C, from data J indicating a frame, from data K indicating a line, and from data L indicating a column. The process value F2 thus generated is added to the least significant bit of the intra-frame process data of the high-order three bits to generate the display data. FIGS. 9A through 9H depict how the process value is added to each of the pixels in the display data.

According to another aspect of the invention, there is provided an image display apparatus for generating display data made of X bits from original image data composed of Y bits, the X bits being fewer than the Y bits, and for using the X-bit display data to drive each of pixels arranged in line and column directions. This image display apparatus comprises: control means for generating a first process value from the most significant bit of the low-order Y–X bits in the Y-bit data (e.g., obtained by adding to the original image data the low-order Y–(X+1) bits of the data corresponding to the preceding pixel on the same column as inter-frame error data), from data indicating a frame and from data indicating the line to which the driven pixel belongs, the control means further generating a second process value from each data of the low-order Y–X bits in the Y-bit data, from data indicating a frame, from data indicating the line to which the driven pixel belongs and from data indicating the column of the driven pixel; and coincidence detecting means for detecting the coincidence of the original image data supplied to contiguous pixels on the same line. In this image display apparatus, if the original image data is not found to coincide for a predetermined number of pixels, the first process value is added to the intra-frame process data based on the high-order X bits of the Y-bit data in order to generate the display data. If the original image data is found to coincide for the predetermined number of pixels, the second process value is added to the intra-frame process data to generate the display data.

More specifically, in the above image display apparatus, a check is made to see if the original image data continues for a predetermined number of pixels (e.g., $2^{(Y-X)}$ pixels). If the original image data is not found to continue for the predetermined number of pixels, then the error diffusion processing shown in FIGS. 6A through 6G and 8A through 8H is conducted. If the original image data is found to continue at least for the predetermined number of pixels, then the error diffusion processing depicted in FIGS. 7A through 7E and 9A through 9H is performed. In the error diffusion processing shown in FIGS. 6A through 6G and 8A through 8H, the pixels to which the process value of "1" is added are evenly diffused within each frame and between frames. In the error diffusion processing depicted in FIGS. 7A through 7E and 9A through 9H, the efficiency of error diffusion is further raised within each frame and between frames. Thus according to the invention, the error diffusion processing illustrated in FIGS. 8A through 8H is carried out if the original image data does not continue for the predetermined number of pixels. If the original image data continues at least for the predetermined number of pixels, the error processing of higher diffusion efficiency in FIGS. 9A through 9H is allowed to take over.

It should be noted that where the same original image data continues for a predetermined number of pixels or more, the error diffusion processing shown in FIGS. 6A through 6G and 8A through 8H still provides enhanced quality of still picture display in gradations.

These and other objects, features and advantages of the invention will become more apparent upon a reading of the following description and appended drawings.

BRIEF DESCRIPTION OF THE DRAWINGS

FIGS. 6A through 6G are schematic views describing how data is processed by use of a first process value;

FIGS. 7A through 7E are schematic views depicting how data is processed by use of a second process value;

FIGS. 8A through 8H are schematic views of cases where the first process value of "1" is added to a group of pixels and where the same original image data is supplied to the pixels arranged as indicated, with the low-order three bits of the supplied data being different from one case to another;

FIGS. 9A through 9H are schematic views of a typical reference table by which to determine the second process value, with the low-order three bits of the supplied data being different from one view to another;

FIG. 10 is a front view of a single screen in which pixels are illustratively arranged;

FIGS. 11A through 11C are schematic views depicting how one conventional type of error diffusion processing is carried out;

FIGS. 12A through 12E are schematic views illustrating how another conventional type of error diffusion processing is performed;

FIGS. 13A and 13B are schematic views showing how error data is diffused by the conventional error diffusion processing of FIGS. 11A through 11C; and FIGS. 14A through 14H are schematic views indicating how error data is diffused by the conventional error diffusion processing of FIGS. 12A through 12E.

DESCRIPTION OF THE PREFERRED EMBODIMENTS

Some preferred embodiments of the invention will now be described with reference to the accompanying drawings.

Figure 1:
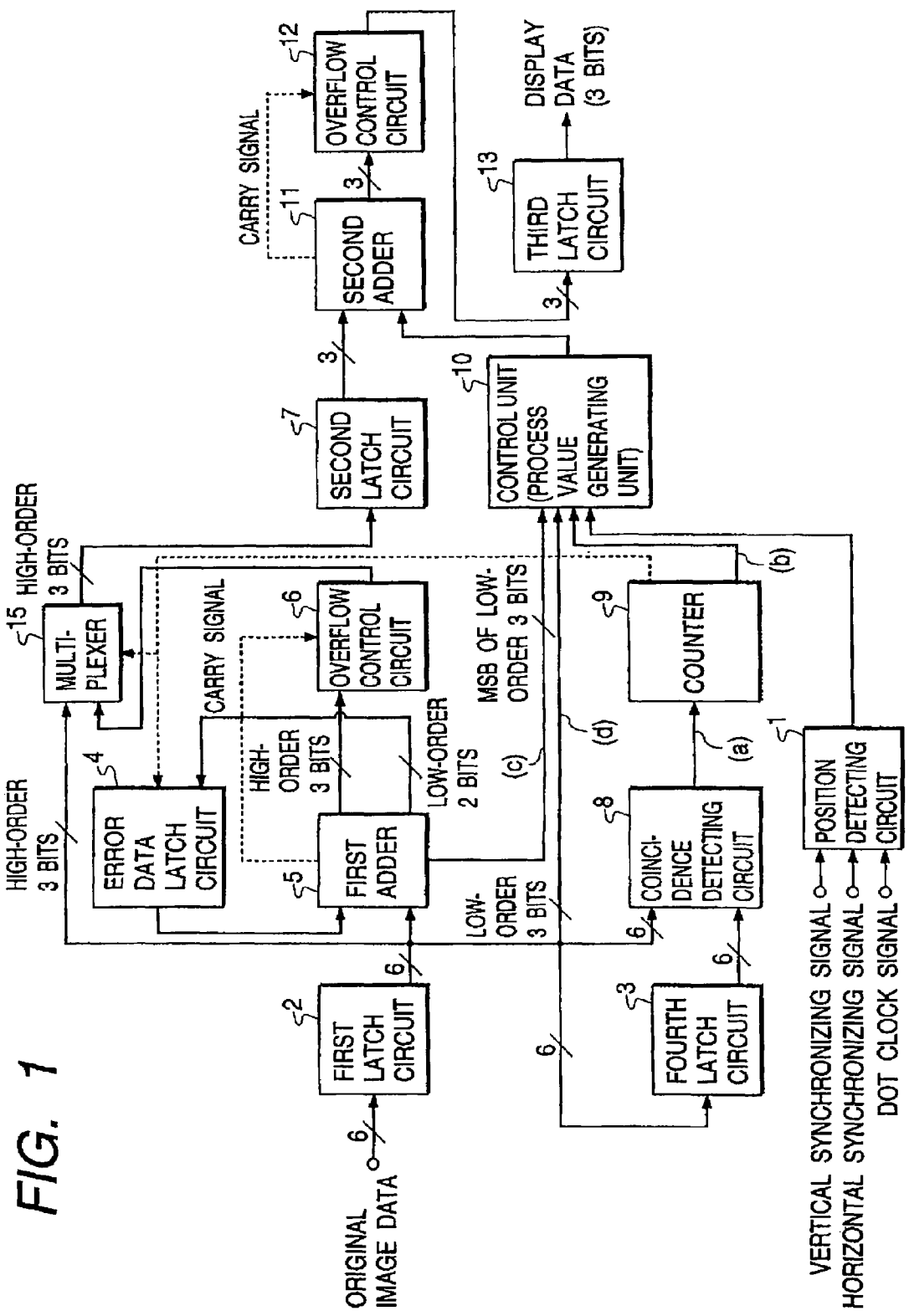
FIG. 1 is a circuit block diagram of an image display apparatus practiced as an embodiment of the invention.
Figure 2:
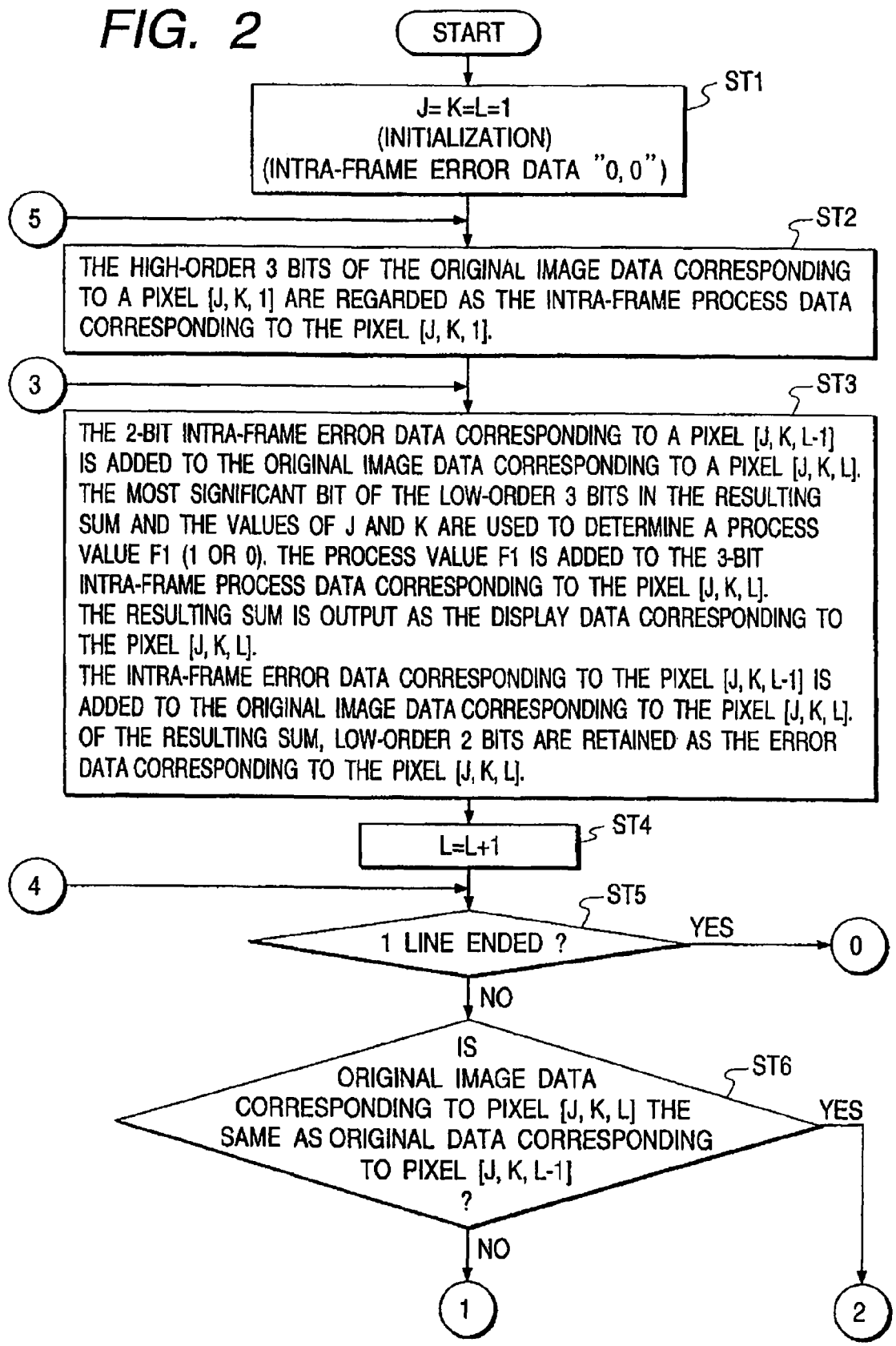
FIG. 2 is a flowchart of steps constituting part of an image display method also embodying the invention by use of the image display apparatus of FIG. 1.
Figure 3:
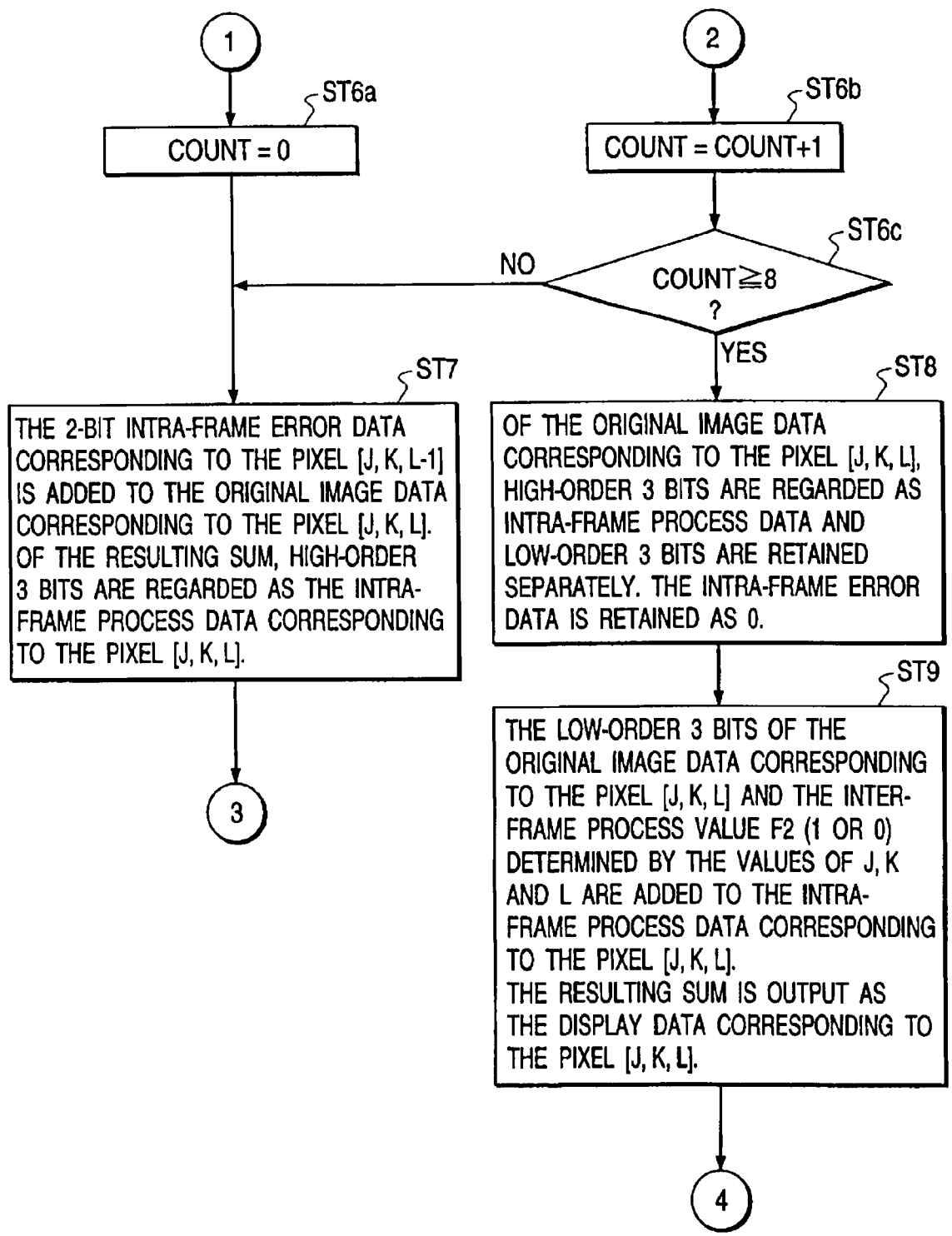
FIG. 3 is another flowchart of steps constituting part of the inventive image display method using the image display apparatus of FIG. 1.
Figure 4:
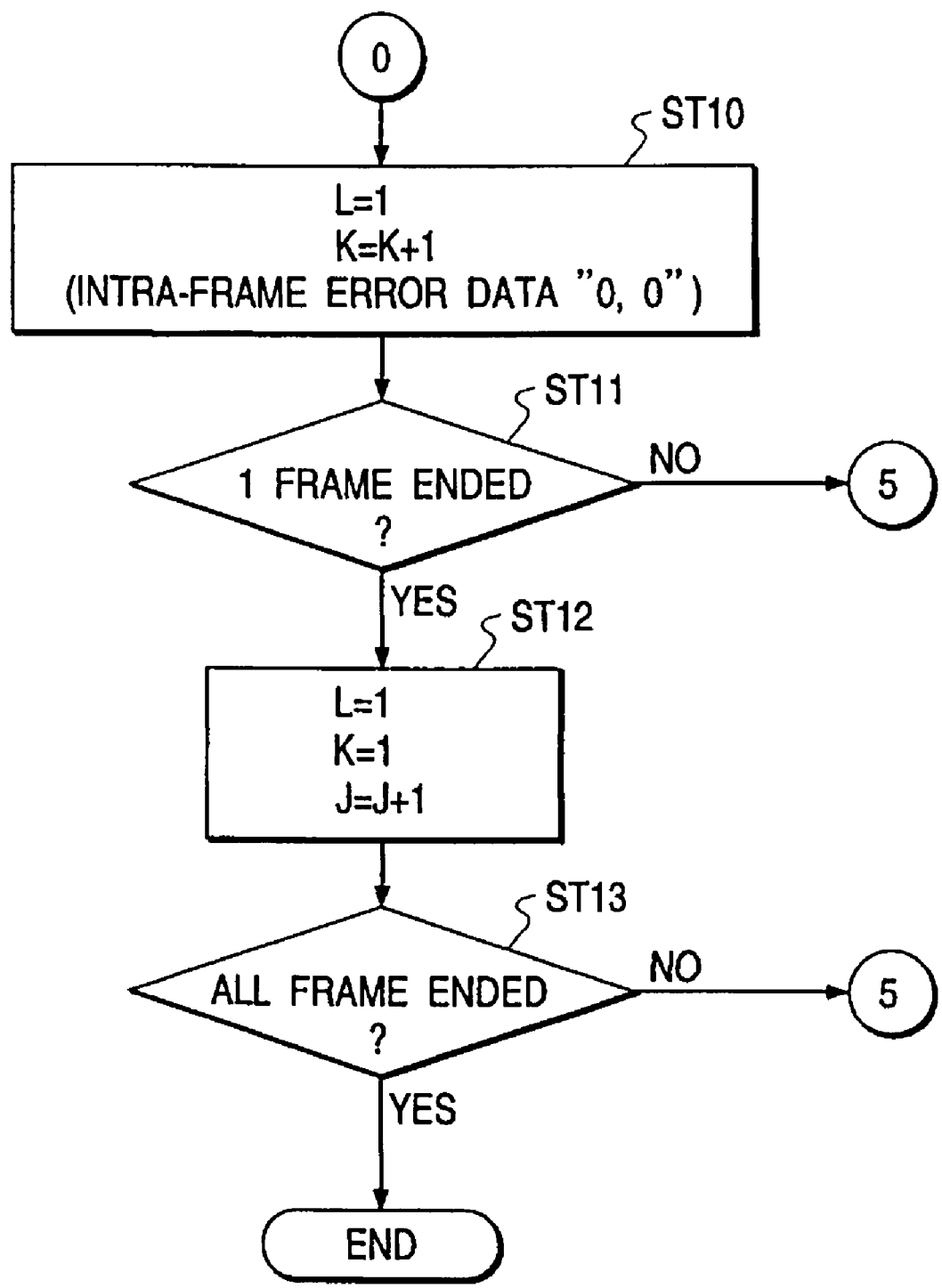
FIG. 4 is another flowchart of steps constituting part of the inventive image display method using the image display apparatus of FIG. 1.
Figure 5:
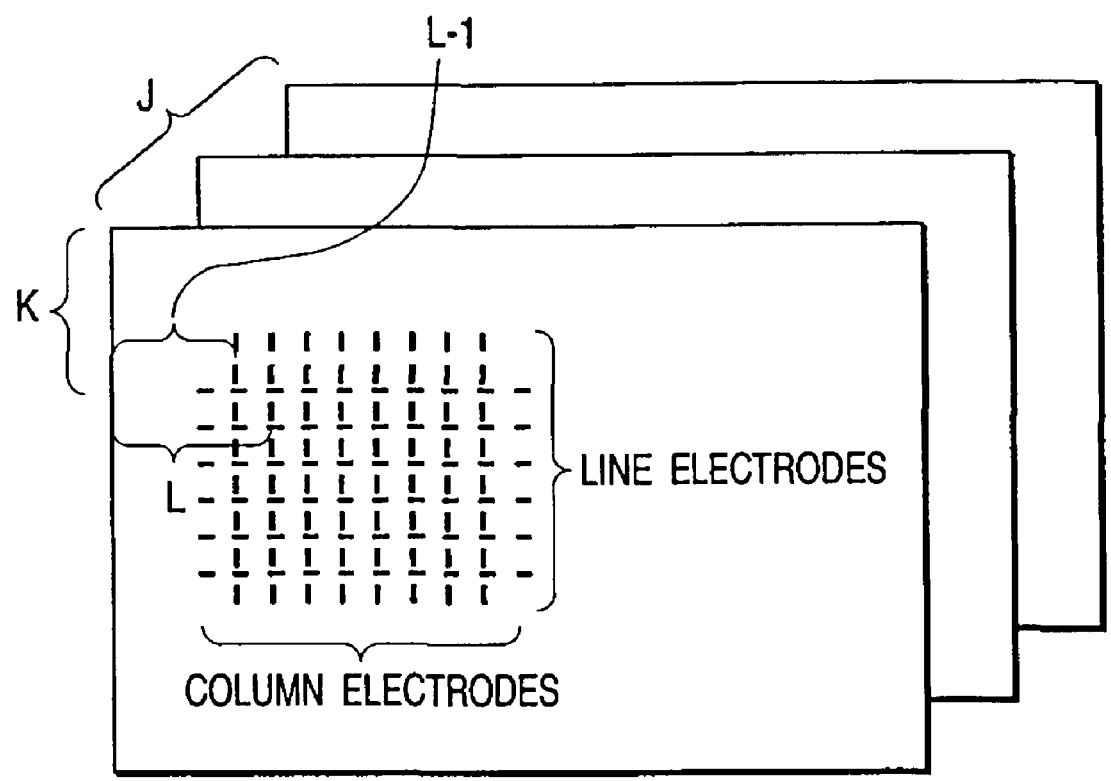
FIG. 5 is a perspective view showing a display screen schematically.
Figure 6C:
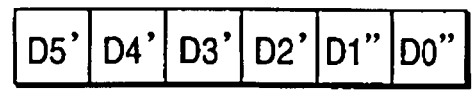

FIG. 1 is a circuit block diagram of an image display apparatus which embodies the invention and in which a signal processing circuit is highlighted. FIGS. 2 through 4 are flowcharts of steps in which the embodiment works, i.e., steps constituting the image processing method according to the invention. FIG. 5 schematically shows a display screen for use with the invention. FIGS. 6A through 6G and 7A through 7E illustrate how signals are processed. FIGS. 8A through 8H indicate arrangements of pixels in which the process value of "1" is added to the display data during the signal processing of FIGS. 6A through 6G. FIGS. 9A through 9H depict arrangements of pixels to which the process value of "1" is added during the signal processing of FIGS. 7A through 7E.

The image display apparatus embodying the invention drives a display medium such as a liquid crystal display (LCD) panel comprising numerous pixels arranged in line and column directions. In this type of display medium, a plurality of pixels arranged crosswise forms each of a plurality of lines. The pixels constitute a matrix pattern having a predetermined number of lines and a predetermined number of columns. As shown in FIG. 5, the line number of each line will be represented by K and the column number of each column by L in the description that follows. In the LCD panel, the line electrodes are fed consecutively with a selecting voltage while the column electrodes are supplied with their driving voltage in synchronism, causing each of the pixels to glow successively. In this embodiment, each pixel is fed with a driving voltage based on three-bit (X=3) display data. Thus one pixel is capable of expressing eight gray levels ($=2^X$). In describing the invention, it is assumed that the screen shown in FIG. 5 is equivalent to one frame which is displayed in a temporally continuous manner. The frame number of each frame is represented by J.

Referring to FIG. 1, a vertical synchronous signal, a horizontal synchronous signal and a dot clock signal from a video signal are input to a position detecting circuit 1 formed around a counter. The position detecting circuit 1 counts a frame number J by counting the vertical synchronous signal. The frame number J is an odd number when the least significant bit of the binary data making up the count value is "0"; the frame number J is an even number when that least significant bit is "1." A line number K is counted by counting the horizontal synchronous signal with reference to the input of the vertical synchronous signal. The line number K is an odd number when the least significant bit of the binary signal making up the count value is "0"; the line number K is an even number when that least significant bit is "1." In addition, a column number L of a given pixel on each line is detected by counting the dot clock signal with reference to the horizontal synchronous signal.

The original image data corresponding to each pixel is composed of six bits as shown in FIGS. 6A and 7A. Of the six bits, D0 is the least significant bit and D5 is the most significant bit. That is, Y=6 with this embodiment. Of the six-bit data, the high-order three bits are used as the basis for generating display data. The three-bit display data (i.e., X=3) is used to drive each of the pixels in the LCD panel.

The six-bit original image data is latched both by a first latch circuit 2 and by a fourth latch circuit 3. The low-order two bits (Y−(X+1)=2) in the six-bit data are latched by an error data latch circuit 4 as intra-frame error data. A first adder 5 adds the six-bit original image data latched by the first latch circuit 2 to the intra-frame error data which corresponds to the preceding pixel (i.e., the pixel to the left on the same line in FIG. 5) and which is latched by the error data latch circuit 4. Of the six-bit data resulting from the addition in the first adder 5, the low-order two bits are latched by the error data latch circuit 4 as the intra-frame error data which is to be added to the original image data corresponding to the next pixel (i.e., the pixel to the right on the same line).

Of the six-bit data resulting from the addition in the first adder 5, the high-order three bits are fed to an overflow control circuit 6 as intra-frame process data. The three-bit data is sent via a multiplexer 15 to a second latch circuit 7 whereby the data is latched. The overflow control circuit 6 functions to keep the high-order three-bit intra-frame process data from overflowing. For example, suppose that the original image data is "111101" and that the first adder 5 adds the two-bit intra-frame error data to the original image data. In such a case, an addition of "1" to the least significant bit of the high-order three bits "111" constituting the intra-frame process data would change the bits to "000." This would supply the second latch circuit 7 with a signal representing a gray level different from that expressed by the initial high-order three bits "111" of the original image data. To prevent such an eventuality, the overflow control circuit 6 retains the intra-frame process data of "111" when a carry signal from the first adder 5 becomes active.

The original image data is latched by the first latch circuit 2 and then fed to a coincidence detecting circuit 8. The coincidence detecting circuit 8 compares two kinds of original image data: the six-bit original image data which is latched by the fourth latch circuit 3 and which corresponds to the preceding pixel (i.e., pixel L−1 in FIG. 5), and the original image data which is latched by the first latch circuit 2 and which corresponds to the pixel L. If the two kinds of original image data are found to coincide with each other, the coincidence detecting circuit 8 gives a coincidence signal (a) such as "1" to a counter 9. The counter 9 counts up a series of coincidence signals (a) received. When $2^3$ (Y−X=3), i.e., eight coincidence signals (a) have arrived in succession, the counter 9 gives a counter output (b) of "1" to a control unit 10. The output of the counter 9 continues to be "0" if the minimum of eight coincidence signals fails to arrive in succession. In other words, when at least eight coincidence signals (a) of "1" each arrive continuously, the counter output remains at "1." Whenever a coincidence signal (a) of "0" arrives, the counter output is immediately changed to "0."

The control unit 10 functions as a generator of process values (F1 and F2). The control unit 10 comprises a computing unit for performing computations, a storage unit that stores a reference table by which to generate the process value F2, a latch circuit for temporarily holding the low-order three bit constituting the intra-frame error data, and a storage unit that stores a process value generation program.

The manner in which the control unit 10 acts upon receipt of the counter output (b) of "1" is different from the manner in which it functions when receiving the counter output (b) of "0." When the counter output (b) of "0" is input, i.e., when the two kinds of original image data fail to coincide for a minimum of eight pixels in succession, the control unit 10 generates the first process value F1 shown in FIG. 6F. The first process value F1 is generated in the following manner. The most significant bit of the low-order three bits in the data resulting from the addition by the first adder 5 is supplied to the control unit 10 over a line (c) and is latched by the latch circuit therein. The computing unit in the control unit 10 then generates the process value F1 by performing computations involving the least significant bit of the frame number J (data indicating a frame) derived from the counting of vertical synchronous signals, the least significant bit of the line number K (data indicating a line) derived from the counting of horizontal synchronous signals, and the most significant bit supplied over the line (c). The computations are carried out as follows:

$$F1 = D2' \& (J\bar{\phi}\&K\phi + J\phi\&K\bar{\phi}) \qquad (1)$$

where, D2' stands for the most significant bit of the intra-frame error data; J$\phi$ denotes the least significant bit of the frame number (frame count value), i.e., the least significant bit of the count value from the counting of vertical synchronous signals; and K$\phi$ represents the least significant bit of the line number (line count value), i.e., the least significant bit of the count value from the counting of horizontal synchronous signals. Also in the equation (1) above, J$\phi$ and K$\phi$ with an upper line each denote the negated values of the respective least significant bits, & represents an AND operation, and + stands for an OR operation.

A second adder 11 adds the process value F1 to the least significant bit of the intra-frame process data made up of the high-order three bits latched by the second latch circuit 7. The three-bit data resulting from the addition is fed to an overflow control circuit 12 which retains the data "111" in the manner described, i.e., by preventing the addition of the process value F1 from changing the data "111" to "000." The overflow control circuit 12 is controlled on the basis of a carry signal from the second adder 11. Moving past the overflow control circuit 12, the three-bit data passes through a third latch circuit 13 to become display data which is fed to the driving circuit of the display panel.

When the counter output (b) of "1" comes from the counter 9, i.e., when the same original image data is supplied for eight consecutively pixels or more, the control circuit 10 generates the second process value F2 shown in FIG. 7D. The process value F2 is generated in the following manner. Of the original image data latched by the first latch circuit 2, the low-order three bits are supplied to the control unit 10 over a line (d) and are latched by the latch circuit therein. The control unit 10 then generates the process value F2 by referring to the reference table stored in the storage unit in accordance with the low-order three bits of the original image data supplied over the line (d), with the least significant bit of the frame count value from the counting of vertical synchronous signals, with the line count value from the counting of horizontal synchronous signals, and with the pixel column count value from the counting of dot clock signals.

When the counter output (b) becomes "1," the multiplexer 15 allows the high-order three bits of the six-bit original image data to pass through unchanged. The high-order three-bit data is fed to the second latch circuit 7 as the intra-frame process data. That is, when the counter output (b) is "0," the high-order three-bit data past the overflow control circuit 6 is given to the second latch circuit 7 via the multiplexer 15; when the counter output (b) becomes "1," the high-order three bits of the original image data from the first latch circuit 2 are fed unmodified to the second latch circuit 7. When the counter output (b) is set to "1," the error data latch circuit 4 is cleared to "00."

With the counter output (b) at "1," the second process value F2 generated by the control unit 10 is given to the second adder 11. In turn, the second adder 11 adds the high-order three bits of the original image data past the multiplexer 15 to the process value F2. The sum of the addition is forwarded through the overflow control circuit 12 and third latch circuit 13 and is supplied as the three-bit display data to the driving circuit of the display panel.

The inventive image display method that uses the signal processing circuit of the above-described image display apparatus will now be described with reference to the flowcharts of FIGS. 2 through 4. In the description that follows, coordinates [J, K, L] indicate the pixel located in frame J, line K, column L. The values J, K and L are an integer variable of at least 1 each.

(Step 1)

When original image data has arrived, the count values of the position detecting circuit 1 are first initialized in step 1. That is, the frame number (frame count value) J, line number (line count value) K and column number (column count value) L are all set to "1." The two bits forming the intra-frame error data are set to "00."

(Step 2)

Step 2 is a process to generate display data for the pixel on the first column of a given line (in FIG. 5, the leftmost pixel on each of the lines). This means that the column number (=L) is always 1 in step 2. The values J, K and L are all "1" each immediately after the start of the image processing constituting step 1 in which the position detecting circuit 1 is initialized. The settings allow the display data corresponding to column 1 of line 1 in frame 1 to be generated.

In the preceding step 1, the first latch circuit 2 latched the six-bit original image data corresponding to the pixel on column 1, i.e., the pixel [J, K, L=1]. In the current step 2, the high-order three bits of the six-bit original image data corresponding to the pixel [J, K, 1] are supplied to the overflow control circuit 6 as the intra-frame process data.

(Step 3)

In step 3, the display data is generated by adding the process value F1 to the intra-frame process data. Whereas L=1 if step 3 has immediately followed step 2, L becomes an integer of at least 2 if step 3 is reached via path ③ in FIG. 2.

In step 3, the control unit 10 generates the process value F1 by performing the computations expressed by the equation (1) above. The computations use, among others, the most significant bit of the low-order three bits in the data resulting from the addition of the intra-frame error data corresponding to the pixel [J, K, L−1] to the original image data corresponding to the pixel [J, K, L]. The computations to generate the process value F1 (binary value "1" or "0") also use the most significant bit, the least significant bit J$\phi$ of the frame count value corresponding to the pixel [J, K, L] and the least significant bit K) of the line count value corresponding to the same pixel. The second adder 11 adds the process value F1 to the least significant bit of the three-bit intra-frame process data corresponding to the pixel [J, K, L]. The sum of the addition is output as the three-bit display data corresponding to the pixel [J, K, L]. The display data is fed to the driving circuit of the display panel, whereby the driving voltage destined to the pixel [J, K, L] in the display panel is generated. The low-order two bits of the data resulting from the addition of the original image data to the intra-frame error data become the intra-frame error data corresponding to the pixel [J, K, L]. The low-order two bits are latched by the error data latch circuit 4 in preparation for the computations regarding the next pixel.

(Step 4)

Following the output of the display data corresponding to the pixel [J, K, L], the value L is incremented by 1 in step 4. This means that the display data generation processing now moves to the next pixel to the right on the same line.

(Step 5)

In step 5, a check is made to see if the display data output to the pixel has been completed for one line. The subsequent processing varies depending on whether or not the display data output has ended for a single line. For now, it is assumed that the display data has yet to be generated for one line.

(Step 6)

Step 6 is constituted by the operation of the coincidence detecting circuit 8. When the first latch circuit 2 latches the original image data corresponding to the pixel [J, K, L], the fourth latch circuit 3 has already retained the preceding original image data, i.e., the original image data corresponding to the pixel [J, K, L−1]. The coincidence detecting circuit 8 compares the six-bit original image data corresponding to the pixel [J, K, L] with the six-bit original image data corresponding to the pixel [J, K, L−1]. If the two kinds of data are found to coincide with each other, the coincidence detecting circuit 8 outputs the coincidence signal (a) to the counter 9.

When the coincidence signal (a) from the coincidence detecting circuit 8 is "0" in step 6, step 6a (FIG. 3) is reached in which the count value on the counter 9 remains "0." When the coincidence signal (a) becomes "1," step 6b (FIG. 3) is reached in which the count value on the counter 9 is incremented by 1. When the coincidence signal (a) is brought to "0" after the increment of 1 on the counter 9, the counter is reset. If the count value on the counter 9 is incremented consecutively up to 8 or higher in step 6c, the counter output (b) to the control unit 10 becomes "1." If the count value on the counter 9 is incremented continuously but fails to reach 8, the counter output (b) remains "0." In other words, if the same original image data fails to continue for at least eight consecutive pixels, the counter output (b) remains "0." If the same original image data continues for eight pixels or more in succession, the counter output (b) becomes "1." Step 6 is followed by step 7 which constitutes the process performed when the counter output (b) is "0," i.e., when the same original image data does not continue for a minimum of eight consecutive pixels.

(Step 7)

In step 7, the first adder 5 is supplied with the six-bit original image data which has been latched by the first latch circuit 2 and which corresponds to the pixel [J, K, L]. The error data latch circuit 4 has latched the two-bit intra-frame error data corresponding to the pixel [J, K, L−1], i.e., the pixel preceding the pixel [J, K, L]. The first adder 5 thus adds the two-bit intra-frame error data corresponding to the pixel [J, K, L−1] to the six-bit original image data corresponding to the pixel [J, K, L]. Of the six-bit data resulting from the addition, the high-order three bits become the intra-frame process data. The intra-frame process data is sent to the second adder 11 by way of the overflow control circuit 6, multiplexer 15 and second latch circuit 7.

Step 7 is followed by step 3 (via path ③ in FIGS. 3 and 2). In step 3, the process value F1 is computed by use of Jφ, Kφ, and the most significant bit of the low-order three bits in the data resulting from the addition of the intra-frame error data corresponding to the pixel [J, K, L−1], to the original image data corresponding to the pixel [J, K, L]. The second adder 11 adds the process value F1 to the intra-frame process data corresponding to the pixel [J, K, L], and outputs the three-bit display data corresponding to the pixel [J, K, L].

When the count value on the counter 9 fails to reach 8 in step 6c, i.e., as long as the same original image data does not continue for at least eight consecutive pixels, step 2 or 7 and step 3 are repeated.

The error diffusion processing in step 2 or 7 and step 3 will now be described in more detail with reference to FIGS. 6A through 6G. When the same original image data fails to continue for eight consecutive pixels, the two-bit intra-frame error data (FIG. 6B) corresponding to the preceding pixel [J, K, L−1] is added to the six-bit original image data (FIG. 6A) corresponding to the current pixel [J, K, L]. Of the six-bit data resulting from the addition (shown in FIG. 6C), the high-order three bits (D5', D4', D3') constitute the intra-frame process data corresponding to the pixel [J, K, L]. The intra-frame process data is sent to the second adder 11 via the multiplexer 15. Of the data in FIG. 6C, the low-order two bits (D1", D0") constitute the intra-frame error data corresponding to the pixel [J, K, L]. The intra-frame error data, latched by the error data latch circuit 4, will be added to the original image data corresponding to the next pixel [J, K, L+1] in succession.

The bit D2' corresponding to the pixel [J, K, L] is fed to the control unit 10 over the line (c). The control unit 10 computes the process value F1 by use of the equation (1) above involving the bit D2', Jφ and Kφ. The process value F1 thus computed is sent to the second adder 11. In turn, the second adder 11 adds the received process value F1 to the intra-frame process data (FIG. 6D) corresponding to the pixel [J, K, L,] to generate the three-bit data depicted in FIG. 6G. The three-bit data constitutes the display data corresponding to the pixel [J, K, L].

The processing in step 2 concerns the pixel in column 1 (L=1) of a given line. In that case, the high-order three bits of the six-bit original image data corresponding to the pixel [J, K, 1] are used as the intra-frame process data shown in FIG. 6D; the low-order two bits of the original image data corresponding to the pixel [J, K, 1] are used as the intra-frame error data corresponding to the pixel [J, K, 2] illustrated in FIG. 6E.

In the processing regarding each pixel in column 2 and subsequent columns of each line, the intra-frame error data corresponding to the preceding pixel is added to the original image data. The low-order two bits of the data resulting from the addition are used as the intra-frame error data corresponding to the current pixel.

FIGS. 8A through 8H show, using a group of pixels, the result of the error diffusion processing illustrated in FIGS. 6A through 6G. As discussed above, the processing of FIGS. 6A through 6G is carried out when the same original image data fails to continue for at least eight consecutive pixels in the line direction. FIGS. 8A through 8H highlight the group of 8×4 pixels as a framework in which the processing of FIGS. 6A through 6G takes place. That is, the processing is performed if the same original image data continues for at least eight consecutive pixels in the line direction (count value in step 6C: 7) and if the same original image data continues for a predetermined number of lines, i.e., four lines in this case.

FIG. 8A shows a case in which the original image data is the same for all pixels in the 8×4 pixel group, with the low-order three bits of the data being "000." FIG. 8B indicates a case where the original image data is also the same for all pixels in the 8×4 pixel group, with the low-order three bits of the data being "001". In each of the cases in FIGS. 8C through 8H, the original image data is the same for all pixels involved, with the low-order three bits of the data changed from "010" to "111." In each of FIGS. 8A through 8H, the upper view is an odd-numbered frame screen and the lower view is an even-numbered frame screen temporally continued to the above odd-numbered frame.

In each of FIGS. 8A through 8H, the black-painted pixels are those in which the value of "1" is added to the least significant bit of the display data of FIG. 6G following the addition of the process value F1 to the three-bit intra-frame process value of FIG. 6D, i.e., pixels in which the binary-signal process value F1 is "1." The pixels each shown as "0" are those to which "0" is added as the process value F1.

In the gray level display simulated through error diffusion and having consecutive pixels in the line direction, the least significant bit of the display data generates a carry in each pixel corresponding to the error distance of the low-order three bits of the original image data. This represents a gray level defined by the low-order three bits in the pixel group. In FIG. 8C, for example, the decimal number expressed by the low-order three bits is "2." In the odd- and even-numbered frames of FIG. 8C, the ratio of the number of black-painted pixels (16) to the total pixel count (64) is 2/8. If the denominator is made to match the value "8" expressed by the low-order three bits, the numerator coincides with the decimal number "2" above.

In the error diffusion processing of FIGS. 8A through 8H, the arrangement of black-painted pixels to which F1=1 is added is different between any two adjacent lines in each frame. In each of FIGS. 8A through 8H, the combination of black-painted pixels in the odd-numbered frame differs from that in the even-numbered frame. The odd- and even-numbered frames in each figure have the same number of black-painted pixels. In FIG. 8D, for example, the odd-numbered frame has the same number of black-painted pixels, which is 12, as the even-numbered frame.

Where the error diffusion processing of FIGS. 6A through 6G is implemented as shown in FIGS. 8A through 8H, there is a reduced probability that the pixels to which F1=1 is added will continue in a stripe-forming fashion on the same columns. Furthermore, the error is evenly diffused between the odd- and even-numbered frames. Such features combine to provide better picture quality of gray level display through error diffusion than the conventional diffusion processing illustrated in FIGS. 14A through 14H.

In the embodiment described above, the error diffusion processing of FIGS. 6A through 6G and 8A through 8H is carried out only if the same original image data fails to continue for eight consecutive pixels. In this type of signal processing, the error data is diffused evenly as illustrated in FIGS. 8A through 8H. That is, if the original image data continues for more than eight pixels in succession, the inventive error diffusion processing still provides significantly higher picture quality than conventional schemes such as the processing of FIGS. 14A through 14H. In other words, where an extensive still picture of the same gray level is given by feeding the same original image data to all pixels making up a certain screen area for a certain period of time, the resulting picture is of high quality thanks to the simulated gray level display based on the error diffusion processing of FIGS. 6A through 6G and 8A through 8H.

In step 6c, the counter output (b) of the counter 9 eventually becomes "1," i.e., the same original image data is fed to more than eight consecutive pixels in the same line. In that case, step 6c is followed by steps 8 and 9.

(Step 8)

The high-order three bits of the original image data corresponding to the pixel [J, K, L] are sent unmodified from the first latch circuit 2 to the second latch circuit 7 via the multiplexer 15. The unmodified high-order three bits of the original image data corresponding to the pixel [J, K, L] are regarded as the intra-frame process data corresponding to the same pixel. The intra-frame error data to be latched by the error data latch circuit 4 is "000."

The low-order three bits of the original image data corresponding to the pixel [J, K, L] are sent from the first latch circuit 2 to the control unit 10 over the line (d). The three-bit data is latched by the latch circuit in the control unit 10. In this case, the low-order three bits of the original image data corresponding to the pixel [J, K, L] are supplied unmodified to the control unit 10.

(Step 9)

In step 9, a binary number is read from a predetermined reference table in accordance with the low-order three bits of the original image data corresponding to the pixel [J, K, L], with data indicating a frame, with data indicating a line, and with data indicating a column. The binary number thus retrieved is used as the second process value F2. The process value F2 is sent to the second adder 11 wherein the process value F2 is added to the high-order three bits of the original image data corresponding to the pixel [J, K, L] given in step 8. The addition produces the three-bit display data.

If the count value in step 6c continuously exceeds 8, i.e., as long as the same original image data continues for more than eight consecutive pixels in the same line, the above signal processing in steps 8 and 9 is repeated.

The error diffusion processing in steps 8 and 9 will now be described in more detail with reference to FIGS. 7A through 7E and 9A through 9H.

Figure 7C:
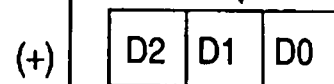
Figure 12C:
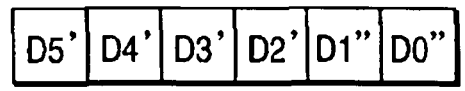

In this kind of error diffusion processing, the high-order three bits of the original image data corresponding to the pixel [J, K, L] in FIG. 7A are fed to the second latch circuit 7 as the intra-frame process data (FIG. 7B) corresponding to the same pixel [J, K, L]. The process value F2 is read from the reference table in accordance with the low-order three bits (D2, D1, D0; FIG. 7C) of the original image data corresponding to the pixel [J, K, L], with data indicating a frame, with data indicating a line, and with data indicating a column. The process value F2 is added to the intra-frame process data to generate the display data (FIG. 7E) corresponding to the same pixel [J, K, L].

The process value F2 is determined beforehand in the reference table arranged in terms of low-order three-bit data, frames, lines and columns. The reference table is set illustratively as shown in FIGS. 9A through 9H. Specifically, the unit of the reference table is a group of 8×4 pixels, i.e., 8 pixels continued in each of four continuous lines. The eight pixels in the line direction are equivalent to a decimal number ($2^{(Y-X)}$) expressed by the low-order three bits of the original image data. The number of lines may be determined as desired. In this example, four lines (8/2=4) are selected as the lines making up each unit pixel group. An odd-numbered frame and an even-numbered frame constitute two unit pixel groups. The decimal number expressed by the low-order three bits of the original image data is 8. That is, eight different values may be expressed by the low-order three bits of the original image data. Therefore the reference table determines the process value F2 that corresponds to all pixels making up 2 units× 8=16 units. In each unit pixel group of FIGS. 9A trough 9H, the black-painted pixels are those in which the process value F2 is "1"; the other pixels are those in which the process value F2 is "0."

One of the determinants used to read the process value F2 from the reference table is the least significant bit of the frame number (frame count value) J, in addition to the low-order three bits of the original image data. When the least significant bit is "0," an odd-numbered frame occurs; when the least significant bit is "1," an even-numbered frame arrives. Another determinant for determining the process value F2 is the line number (line count value) K defining up to four continuous lines. That is, the low-order two bits of the line count value are used. As the column number (column count value) L, a decimal number expressed by the low-order three bits defining up to eight columns is used to read the process value F2.

For example, where the three least significant bits of the same continuous original image data are "000," the process value F2 determined by the reference table is "0" for each of the pixels making up the unit pixel group in the odd- and even-numbered frames shown in FIG. 9A.

The process value F2 is "0" if the three least significant bits of the original image data are "001," if the least significant bit of the frame count value is illustratively "0" (odd-numbered frame), and if the line number K is "0" and the column number L is 2 for the unit pixel group (8×4 pixels) in FIG. 9B. The process value F2 is "1" if the column number L is 5.

The same applies to FIGS. 9C through 9H. For example, the process value F2 is "0" if the three least significant bits of the original image data are "011," if the least significant bit of the frame count value is "1" (even-numbered frame), and if the line number K is "0" and the column number L is also "0" for each of the pixels constituting the unit pixel group. The process value F2 is "1" if the three least significant bits are "011," if the least significant bit of the frame count value is "0" (odd-numbered frame), and if the line number K is "1" and the column number L is "2" for each of the pixels making up the unit pixel group.

Where the same original image data continues for more than eight consecutive pixels on the same line during the error diffusion processing of steps 8 and 9, the process value F2 is set subsequently to "0" or to "1" depending on the reference table of FIGS. 9A through 9H as long as the same original image data continues along the same line. Where the same original image data continues for more consecutive pixels on a further number of continuous lines occupying a more extensive screen area, more units of the pixel group in any one of FIGS. 9A through 9H will be displayed crosswise on the screen.

In determining the process value F2 by use of the reference table in FIGS. 9A through 9H, the combination of pixels in which F2=1 always differs between any two adjacent lines as well as between any two adjacent columns of each pixel group (8×4 pixels). The combination of pixels in which F2=1 in each odd-numbered frame is always different from that in each even-numbered frame. The number of pixels in which F2=1 is the same in both the odd- and even-numbered frames. In addition, no more than three pixels in which F2=1 or 0 occur consecutively in the line or column direction. In FIG. 9D, for example, there are three consecutive pixels in which F2=0 in column L4 of the odd-numbered frame, whereas no more than three consecutive pixels in which F2=1 occur in the column or line direction of this odd-numbered frame. In FIGS. 9F, 9G and 9H, three or more consecutive pixels in which F2=1 occur at places, but there occur no more than three consecutive pixels in which F2=0 in the same figures.

With the process value F2 determined as described, even if the original image data corresponding to all pixels in a certain screen area is the same, the error of the low-order three bits (low-order Y-x bits) is evenly diffused within each frame as well as between frames. This provides high image quality free of stripes or flickers for a still picture display at a certain gray level over an extensive screen area.

In particular, if the same original image data does not continue for at least eight consecutive pixels, the error diffusion processing of FIGS. 8A through 8H is carried out; if the same original image data continues for more than eight consecutive pixels, the error diffusion processing of FIGS. 9A through 9H is performed for a higher degree of error diffusion. Thus images of any gray level patterns may be improved in overall picture quality.

In step 5 in the flowchart of FIG. 2, a check eventually shows that the signal processing made up of steps 2, 3, 7 or 8, and 9 is completed for one line. In that case, step 5 is followed by step 10 in FIG. 4. In step 10, the next line for which to generate display data is reached. Also in step 10, the intra-frame error data in the error data latch circuit 2 is cleared. In step 11, a check is made to see if the processing for one frame is completed. If the processing has yet to be completed for one frame, step 2 in FIG. 2 is again reached via path ⑤. In that case, the generation of display data is resumed from the next pixel on the first column. If the processing for one frame is found to be completed in step 11, step 12 is reached in which the next frame to be processed is reached. In step 13, a check is made to see if the processing is completed for all frames. If the processing has yet to be completed for all frames, step 13 is followed by step 2 via path ⑤. In step 2, the generation of display data is resumed.

As described, the image display method and apparatus according to the invention generate display data by use of the high-order X bits of the Y-bit original image data, and diffuse the gray level error data given by the low-order Y–X bits in an even manner both within each frame and between frames. This provides high image quality free of stripes or flickers when a still picture of a given gray level is generated by supplying the same original image data to each of the pixels making up a certain screen area over an extended period of time.

According to the invention, the key determinant for determining the process value to be added to the intra-frame process data is either the error data corresponding to the preceding pixel in the same line, or the low-order bits of the original image data corresponding to the current pixel. Unlike conventional setups, this scheme eliminates the need for retaining throughout the current frame the error data inherited from the preceding frame, whereby the control procedure for error data read-out is simplified.

While preferred embodiments of the invention have been described using specific terms, such description is for illustrative purposes only, and it is to be understood that changes and variations may be made without departing from the spirit and scope of the following claims.

What is claimed is:

1. An image display method comprising the steps of:
generating display data made of X bits from original image data composed of Y bits, said X bits being fewer than said Y bits;
using the X-bit display data to drive each of pixels arranged in line and column directions; and
generating a binary-signal process value to be added to intra-frame process data based on the high-order X bits of said original image data;
wherein, if the same original image data is made to correspond with a group of pixels on $2^{(Y-X)}$ columns continued on each of a predetermined number of lines, said process value is arranged so that each of adjacent lines in the pixel group will have a different combination of pixels in which the process value of "1" is added to said intra-frame process data.

2. An image display method according to claim 1, wherein, if the same image data is made to correspond with the pixels in the pixel group over two temporally continuous frames, each of the two frames is arranged to have a different combination of pixels in which said process value of "1" is added to said intra-frame process data.

3. An image display method comprising the steps of:
generating display data made of X bits from original image data composed of Y bits, said X bits being fewer than said Y bits;
using the X-bit display data to drive each of pixels arranged in line and column directions; and
generating a binary-signal process value to be added to intra-frame process data based on the high-order X bits of said original image data;
wherein, if the same original image data is made to correspond with a group of pixels on $2^{(Y-X)}$ columns continued on each of a predetermined number of lines constituting two temporally continuous frames, said process value is arranged so that each of the two frames will have the same number of pixels in which the process value of "1" is added to said intra-frame process data in the pixel group.

4. An image display method comprising the steps of:
generating display data made of X bits from original image data composed of Y bits, said X bits being fewer than said Y bits;
using the X-bit display data to drive each of pixels arranged in line and column directions; and
generating a binary-signal process value to be added to intra-frame process data based on the high-order X bits of said original image data;
wherein, if the same original image data is made to correspond with a group of pixels on $2^{(Y-X)}$ columns continued on each of a predetermined number of lines constituting two temporally continuous frames, said process value is arranged so that each of the two frames will have the same number of pixels in which the process value of "1" is added to said intra-frame process data in the pixel group and that each of adjacent lines in said pixel group will have a different combination of pixels in which said process value of "1" is added to said intra-frame process data.

5. An image display method according to claim 2, 3 or 4, wherein, $m/2^{(Y-X)}$ represents the ratio of the number of pixels to which said process value of "1" is added, to the total number of pixels in said pixel group over said two temporally continuous frames, where m is a decimal number expressed by the low-order Y-X bits of said original image data.

6. An image display apparatus for generating display data made of X bits from original image data composed of Y bits, said X bits being fewer than said Y bits, and for using the X-bit display data to drive each of pixels arranged in line and column directions, said image display apparatus comprising:
control means for generating a process value from the most significant bit of the low-order Y-X bits in the Y-bit original image data, from data indicating a frame, and from data indicating the line to which the driven pixel belongs; and
adding means for generating said display data by adding said process value to intra-frame process data based on the high-order X bits of said original image data.

7. An image display apparatus for generating display data made of X bits from original image data composed of Y bits, said X bits being fewer than said Y bits, and for using the X-bit display data to drive each of pixels arranged in line and column directions, said image display apparatus comprising:
first adding means for adding to said original image data as inter-frame error data predetermined low-order bits of the data corresponding to the preceding pixel on the same line;
control means for generating a process value from the most significant bit of the low-order Y-X bits in the data resulting from the addition, from data indicating a frame, and from data indicating the line to which the driven pixel belongs; and
second adding means for generating said display data by adding said process value to intra-frame process data based on the high-order X bits of said original image data.

8. An image display apparatus for generating display data made of X bits from original image data composed of Y bits, said X bits being fewer than said Y bits, and for using the X-bit display data to drive each of pixels arranged in line and column directions, said image display apparatus comprising:
control means for generating a process value from the low-order Y-X bits in the Y-bit original image data, from data indicating a frame, from data indicating the line to which the driven pixel belongs, and from data indicating the column of the driven pixel; and
adding means for generating said display data by adding said process value to intra-frame process data based on the high-order X bits of said Y-bit original image data.

9. An image display apparatus for generating display data made of X bits from original image data composed of Y bits, said X bits being fewer than said Y bits, and for using the X-bit display data to drive each of pixels arranged in line and column directions, said image display apparatus comprising:
control means for generating a first process value from the most significant bit of the low-order Y-X bits in the Y-bit original image data, from data indicating a frame and from data indicating the line to which the driven pixel belongs, said control means further generating a second process value from each data of said low-order Y-X bits in said Y-bit original image data, from data indicating a frame, from data indicating the line to which the driven pixel belongs and from data indicating the column of the driven pixel; and
coincidence detecting means for detecting the coincidence of the original image data supplied to contiguous pixels on the same line;
wherein, if said original image data is not found to coincide for a predetermined number of pixels, said first process value is added to said intra-frame process data based on said high-order X bits of said Y-bit original image data in order to generate said display data; and
wherein, if said original image data is found to coincide for said predetermined number of pixels, said second process value is added to said intra-frame process data in order to generate said display data.

* * * * *